United States Patent
Troy et al.

(10) Patent No.: US 8,892,252 B1
(45) Date of Patent: Nov. 18, 2014

(54) MOTION CAPTURE TRACKING FOR NONDESTRUCTIVE INSPECTION

(71) Applicant: The Boeing Company, Seal Beach, CA (US)

(72) Inventors: James J. Troy, Issaquah, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 13/744,730

(22) Filed: Jan. 18, 2013

Related U.S. Application Data

(63) Continuation-in-part of application No. 13/210,899, filed on Aug. 16, 2011, now Pat. No. 8,738,226, and a continuation-in-part of application No. 13/210,899, filed on Aug. 16, 2011, now Pat. No. 8,738,226.

(60) Provisional application No. 61/706,599, filed on Sep. 27, 2012.

(51) Int. Cl.
*G06F 19/00* (2011.01)
*G01B 11/14* (2006.01)

(52) U.S. Cl.
CPC ..................... *G01B 11/14* (2013.01)
USPC .......... 700/245; 700/213; 700/259; 700/258; 700/255; 700/253

(58) Field of Classification Search
CPC combination set(s) only.
See application file for complete search history.

(56) References Cited

U.S. PATENT DOCUMENTS

| | | | |
|---|---|---|---|
| 7,643,893 | B2 | 1/2010 | Troy et al. |
| 7,804,602 | B2 | 9/2010 | Raab |

OTHER PUBLICATIONS

U.S. Appl. No. 13/210,899, filed Aug. 16, 2011.

*Primary Examiner* — Bhavesh V Amin
(74) *Attorney, Agent, or Firm* — Ostrager Chong Flaherty & Broitman P.C.

(57) ABSTRACT

A system that uses optical motion capture hardware for position and orientation tracking of non-destructive inspection (NDI) sensor units. This system can be used to track NDI sensor arrays attached to machine-actuated movement devices, as well as in applications where the NDI sensor array is hand-held. In order to achieve integration with NDI hardware, including proprietary systems commercially available, a data acquisition device and custom software are used to transmit the tracking data from the motion capture system to the NDI scanning system, without requiring modifications to the NDI scanning system.

20 Claims, 7 Drawing Sheets

MOTION CAPTURE TRACKING FOR NONDESTRUCTIVE INSPECTION

RELATED PATENT APPLICATIONS

This application is a continuation-in-part of and claims priority from U.S. patent application Ser. No. 13/210,899 filed on Aug. 16, 2011, which in turn claims priority from and the benefit of U.S. Provisional Application No. 61/509,098 filed on Jul. 18, 2011. This application also claims priority from and the benefit of U.S. Provisional Application No. 61/706,599 filed on Sep. 27, 2012.

BACKGROUND

This disclosure generally relates to motion capture systems for tracking the position and orientation of non-destructive inspection (NDI) sensor units designed to scan a target area.

In NDI applications, one of the problems to overcome is achieving accurate location (position and orientation) tracking, particularly for applications beyond a simple X-Y grid. Motion capture systems are commercially available which can be used to address this problem using very accurate (sub-millimeter) position tracking.

Existing NDI tracking solutions typically use direct encoder input, such as a wheeled rotary encoder connected directly to the NDI scanning hardware. For example, a one-dimensional scanning unit is known that uses an integrated wheeled encoder, where the motion of the wheel over the surface provides distance traveled for processing by the NDI scan application. This type of configuration works fine if the operator can maintain a straight motion path, the encoder wheel does not slip, and there are no discontinuities in the surface. But there are many applications in which the area to be scanned does not fit well with standard encoder-based tracking process, including motion paths requiring more of a free-form motion over surfaces. These surfaces may have obstructions that will cause the encoder wheel to skip, which causes a disruption in the alignment of the recorded scan. In addition, standard encoder-based tracking can only provide relative motion tracking, which gives a dead-reckoning type of solution based on the initial starting position; in accordance with that process, any wheel disturbances lead to accumulating positioning error. Typical encoder-based implementations do not address orientation of the NDI sensor array relative to the scanned object, which leads to scan misalignment and is another source of accumulating error.

Another type of existing tracking apparatus used for NDI scanning is an X-Y track type of device. This type of system is attached to the object to be scanned and uses direct input of X and Y linear encoder data to the NDI scanning hardware. This type of device does not suffer from drift, but requires extra space on the surface of the scanned object in which to install the X-Y track elements.

Another type of tracking device allows for two-dimensional motions, but this device only allows motion of one axis at a time. The user is required to press a button to switch the direction of motion. Since it is encoder-based, it can only measure relative motion and is susceptible to drift.

There is a need for a system that enables precise tracking of the position and orientation of a NDI sensor unit and conversion of the acquired tracking data into encoder pulse signals for processing by a NDI scanning system.

SUMMARY

The subject matter disclosed herein includes a system that uses optical motion capture hardware for position and orientation tracking of non-destructive inspection (NDI) sensor units. This system can be used to track NDI sensor arrays attached to machine-actuated movement devices, as well as in applications where the NDI sensor array is hand-held. In order to achieve integration with NDI hardware, including proprietary systems commercially available, a data acquisition device and custom software are used to transmit the tracking data from the motion capture system to the NDI scanning system, without requiring modifications to the NDI scanning system. The data acquisition device and customized software are designed to simulate encoder pulses, which are then fed to the NDI scanning system. This solution enables the integration of location data from the motion capture system with an encoder-based NDI scanning system that reads the scan information from the NDI sensor array.

In accordance with one embodiment, a motion capture system measures position and orientation of an inspection unit and provides that data to downstream processes that use it, such as (a) a three-dimensional visualization display and (b) a data acquisition device. The three-dimensional visualization display uses both the position data and orientation data, while the data acquisition device only uses the position data—specifically the X and Y positions. The data acquisition device converts the X and Y position data into X pulses and Y pulses. These pulses are electrical signals that look just like signals that would be generated by real hardware encoders. The X and Y pulses are sent (over dedicated cables) to the input encoder receivers of NDI hardware. The X and Y pulses are received by the NDI application and converted into X and Y positions representing the positions of those portions of the part that were scanned. The NDI application reads the NDI data from the NDI inspection unit, and associates that data with the current X and Y position data to create one aligned row of the resulting NDI scan representation. (Multiple rows, registered in the same coordinate system, are assembled to create the final result.)

The integration of location data from the motion capture system with an encoder-based scanning system provides at least the following features: (1) the capability to perform free-form motion tracking; (2) the ability to scan in an absolute coordinate system (without any accumulating drift or scan misalignment issues); (3) an interface with existing NDI scanning hardware that requires no modifications; (4) passive markers attached to the scanning device in a known pattern such that the motion capture system provides the position and orientation defined relative to the origin of the scanning device (no external cabling to the scanner is required); (5) multiple NDI scan units (or other components, such as robotic or surgical NDI arm devices) can be tracked simultaneously; (6) real-time, sub-millimeter position tracking at very high update rates and with low latency; (7) the system can be scaled to larger work volumes by adding more motion capture cameras; and (8) location data can be defined in the local coordinates of the objects being scanned.

The foregoing features provide a system that can be used in NDI environments. Many known types of scanning systems have been developed for specific types of applications, whereas the solution presented in this disclosure is intended to be a general purpose system that can be used for multi-dimensional scanning on a variety of flat or curved surfaces, in confined spaces (like corners), and with disturbances on the surfaces (like gaps, rivets, lap joints, etc.), which would cause problems for encoder-based systems. The ability to represent the data in the coordinate system of the scanned object (e.g., an airplane) allows alignment of the scans with CAD models, or other location referenced data (images, text, etc.).

Optionally, three-dimensional visualization can be integrated with motion capture tracking and NDI scanning. This visualization runs on a three-dimensional graphics-enabled computer as an independent computational process in parallel with the NDI process. The visualization application can also be run in a post-process (analysis only) mode, i.e., without the NDI application. This visualization process also uses real-time location data (not yet converted into encoder pulses) from the motion capture system to position three-dimensional object models in a virtual environment. This three-dimensional virtual environment display provides situational awareness of the NDI sensor relative to the scan environment.

One aspect of the subject matter disclosed herein is a method for scanning across a surface of a part within a capture volume, comprising: (a) scanning the surface of the part using an inspection unit; (b) acquiring measurement data representing one or more motion characteristics of the inspection unit using a motion capture system operatively disposed with respect to the capture volume, the one or more motion characteristics being measured using a plurality of retro-reflective markers attached to the inspection unit in a known pattern; (c) deriving position data and orientation data from the measurement data, said position data and orientation data representing positions and orientations of the inspection unit in a coordinate system of the part being scanned; (d) acquiring inspection data during step (a); and (e) combining the position data derived in step (c) with the inspection data acquired in step (d). The method may further comprise displaying the inspection data in accordance with the position data; and using the position data and the orientation data to position and orient a three-dimensional model of the inspection unit in a virtual environment.

Another aspect is a method for scanning across a surface of a part within a capture volume, comprising: (a) moving an inspection unit along a desired path on the surface of the part; (b) measuring positions of retro-reflective markers attached to the inspection unit with respect to a motion capture coordinate system; (c) converting measurements of the positions of the retro-reflective markers with respect to the motion capture coordinate system into first position data and orientation data representing the positions and orientations of the inspection unit with respect to the coordinate system of the part; (d) encoding the first position data into simulated encoder pulses which indicate the positions of the inspection unit with respect to the coordinate system of the part; (e) acquiring inspection data during movement of the inspection unit along the desired path; (f) sending the simulated encoder pulses and the acquired inspection data to a processor; (g) decoding the simulated encoder pulses into second position data representing positions of the inspection unit with respect to the coordinate system of the part; (h) associating the second position data with the inspection data; and (i) displaying the inspection data in accordance with associations made in step (g).

A further aspect of the disclosed subject matter is a system comprising: an inspection unit disposed on a portion of a surface of a part located within a capture volume and operable to acquire inspection data during its motion; a motion capture subsystem programmed to acquire first location data representing positions and orientations of said inspection unit with respect to a motion capture coordinate system; a motion tracking subsystem connected to receive said first location data from said motion capture subsystem and programmed to output second location data which is a function of the first location data received from said motion capture subsystem, said second location data representing positions and orientations of said inspection unit with respect to a coordinate system of said part; a data acquisition device connected to receive said second location data from said motion tracking subsystem and programmed to encode portions of said second location data received from said motion tracking subsystem into simulated encoder pulses; and an inspection scanning subsystem with pulse-based position inputs connected to receive said simulated encoder pulses from said data acquisition device and said inspection data from said inspection unit, said inspection scanning subsystem with pulsed-based position inputs being programmed to decode encoder pulses into position data and then associate said position data with said inspection data for display, wherein said position data represents the positions of said inspection unit with respect to said coordinate system of said part. The motion capture system may comprise at least two cameras with illuminators and the inspection unit carries a plurality of retro-reflective markers arranged in a known pattern.

Yet another aspect is a system for nondestructive inspection of a part within a capture volume, comprising: an inspection unit disposed on a surface of said part within said capture volume and operable to acquire inspection data during its motion; a plurality of retro-reflective markers attached to said inspection unit and arranged in a known pattern; a plurality of cameras with illuminators, each camera being capable of receiving light transmitted by said illuminators and reflected from said markers and converting said received light into image space measurement data representing one or more motion characteristics of said inspection unit with respect to a motion capture coordinate system; and a computer system connected to receive inspection data from said inspection unit and image space measurement data from said cameras. The computer system is programmed to perform the following operations: (a) deriving position data and orientation data from the image space measurement data, said position data and orientation data representing the positions and orientations of said inspection unit with respect to a coordinate system of said part and; and (b) associating the position data with the inspection data. The system may further comprise a display monitor connected to said computer system, said computer system being further programmed to control said display monitor to display the inspection data in accordance with associations made in operation (b) or display in a virtual environment a three-dimensional model of said inspection unit positioned and oriented relative to a three-dimensional model of said part.

Another aspect is a system for nondestructive inspection of a part within a capture volume, comprising: an inspection unit disposed on a surface of said part within said capture volume and operable to acquire inspection data during its motion; a plurality of retro-reflective markers attached to said inspection unit and arranged in a pattern; a plurality of cameras with illuminators, each camera being capable of receiving light transmitted by said illuminators and reflected from said markers and converting said received light into image space measurement data; means for converting the image space measurement data from at least two cameras into first position data and orientation data representing the positions and orientations of said inspection unit with respect to a motion capture coordinate system; means for transforming said first position data into second position data representing the positions of said inspection unit with respect to a coordinate system of the part being scanned; means for encoding said second position data into simulated encoder pulses; means for decoding said simulated encoder pulses into third position data representing the positions of said inspection unit with respect to the coordinate system of the part being scanned; and means for displaying an image based on inspection data acquired by said inspection unit and said third position data. In accordance with one embodiment, the means for encoding comprise: a computer that converts said second position data into digital pulse commands; and a data acquisition device that converts said digital pulse commands into said simulated encoder pulses.

Other aspects of an integrated system that combines motion capture with NDI scanning systems and situational awareness displays are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
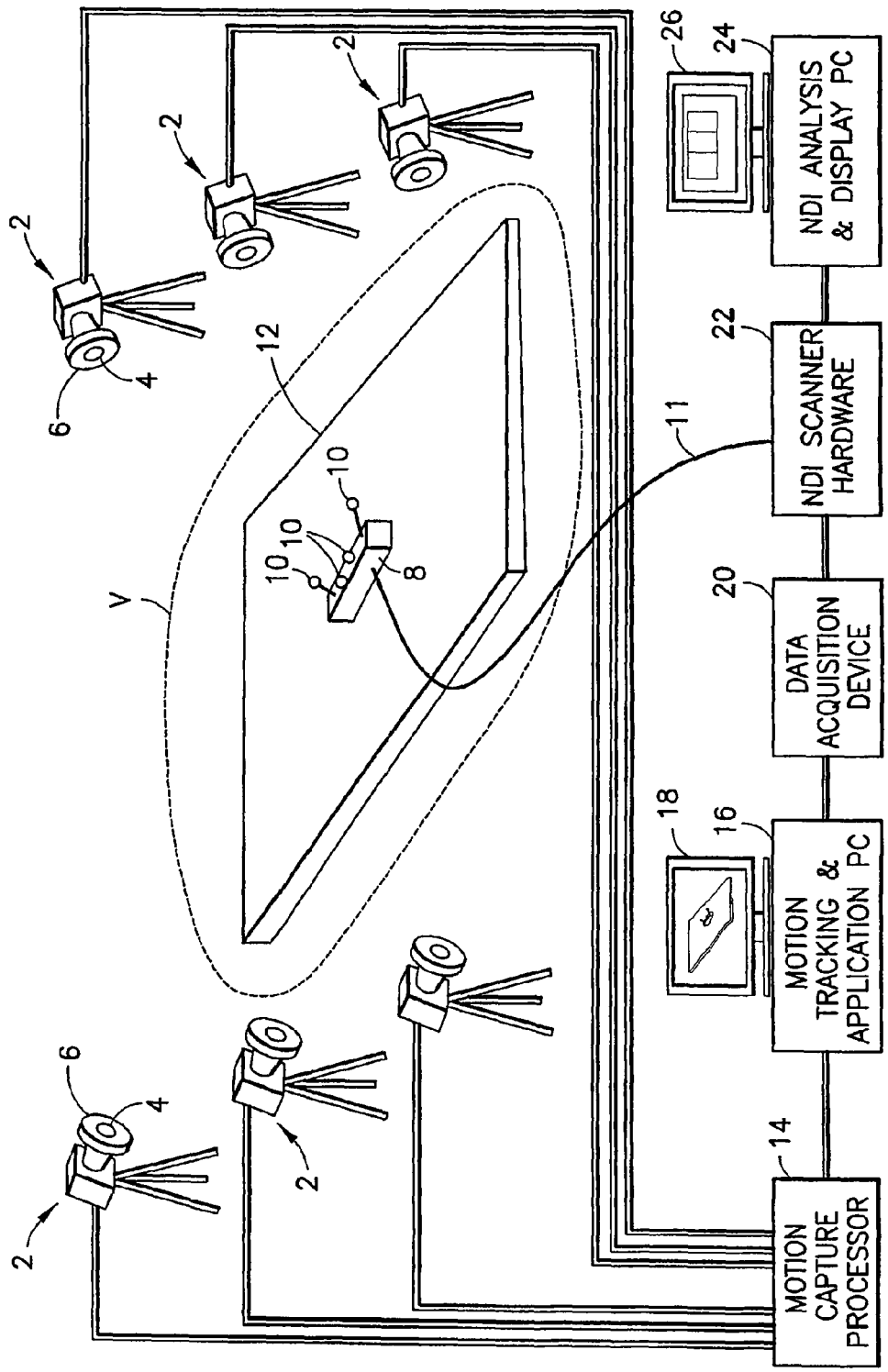
FIG. 1 is a diagram showing a schematic view of a motion capture system in accordance with one embodiment which is suitable for tracking an NDI sensor unit.

FIG. 1 shows a basic system configuration for a motion capture-based tracking method in accordance with one embodiment. Multiple motion capture cameras 2 (at least two) are set up around the object 12 to be scanned to create a three-dimensional capture volume V that captures motion for all six degrees-of-freedom (6-DOF) of the object 8 being tracked (3-DOF position: x, y, z; and 3-DOF orientation: roll, pitch, yaw). In the embodiment shown in FIG. 1, the object 12 to be scanned is a surface (e.g., a surface on an aircraft) and the tracked object 8 is an NDI sensor unit. Multiple objects in the capture volume can be tracked simultaneously, e.g., in an inspection scenario where multiple NDI sensor units are scanning a large surface. Each object 8 to be tracked has a respective group of passive retro-reflective markers (at least three) attached thereto, the markers of each group being arranged in a respective unique pattern. In the example shown in FIG. 1, the NDI sensor unit 8 has four retro-reflective markers 10. The markers of each group are arranged in known patterns, and the information for defining the patterns is stored in the motion capture processor 14. A marker pattern can be defined relative to a specific location on the NDI sensor unit 8 so that the marker pattern origin aligns with the origin of the NDI sensor unit; or in the alternative, the marker pattern can be attached to the NDI sensor unit 8 and then the offset position and orientation between the origin of the marker pattern and the origin of the NDI sensor unit is determined and used in a matrix transformation multiplication. The result from either approach is that the position and orientation of marker pattern determined by the motion capture system associated with that marker pattern is defined relative to the origin of the NDI sensor unit. Each group of markers may comprise a plurality of small spheres (e.g., about ¼ inch in diameter) attached to a rigid platform. In accordance with alternative embodiments, the tracked objects can include NDI sensor units (e.g., ultrasonic transducer arrays) as well as other equipment of interest in the capture volume.

Each motion capture camera 2 seen in FIG. 1 can be a video camera of the type comprising a ring of LEDs 6 surrounding a camera lens 4. In conjunction with such cameras, each retro-reflective marker 10a-d may comprise a hemispherical or ball-shaped body coated with reflective paint that reflects impinging light from the LEDs 6 of each camera 2 back toward the associated lens 4 of the respective camera in a well-known manner. The motion capture system utilizes data captured from image sensors inside the cameras to triangulate the three-dimensional position of the target object between multiple cameras configured to provide overlapping projections.

The outputs from cameras 2 are input to respective ports of motion capture processor 14. The motion capture processor 14 collects real-time image information from all of the motion capture cameras 2, processes the image data, and sends the information along a dedicated connection to the motion tracking and applications computer 16, which has a display monitor 18 associated therewith for displaying the processed image data. Alternatively, the software functions executed by motion capture processor 14 and motion tracking and applications computer 16 can be executed by a single computer, i.e., the two hardware components can be integrated inside one enclosure.

At each frame update, the positions of all of the passive markers 10 in the capture volume V can be captured by each camera 2 and converted by the motion capture processor 14 into three-dimensional coordinates, which are then associated with the known marker patterns for each tracked object, resulting in full 6-DOF position and orientation representations for the tracked objects. A separate data conversion application running on applications computer 16 accesses this object position/orientation data (also referred to herein as "location data") through a network socket connection to the motion capture processor.

The data conversion application transforms the location data into the coordinate system for the NDI scan, and then converts the coordinate data into quadrature encoder pulses, which are produced in the same format as pulses from a commercially available position encoder. These simulated encoder pulses are sent out through a data acquisition device 20 to the NDI scanner hardware 22. In accordance with one embodiment, the data acquisition device 20 is a hardware component that takes pulse instructions (i.e., 1's and 0's from the motion tracking and application PC 16) and converts them into actual electrical pulses at the correct voltage that are sent over signal wires to the inputs of the NDI scanner hardware 22.

In accordance with one embodiment, the NDI scanner hardware 22 is an integrated unit comprising a pulser, a receiver and an electronics box. The NDI scanner hardware 22 converts the encoder pulses onto a current X,Y position in accordance with the formulas:

$$X\_pos = num\_of\_x\_pulses\_received * x\_scale\_factor$$

$$Y\_pos = num\_of\_y\_pulses\_received * y\_scale\_factor$$

where each scale factor is a small number (e.g., on the order of 0.01 inch per pulse). This X,Y position is updated many times per second.

At the same time the NDI sensor unit 8 is capturing inspection data (e.g., scan imaging data). In the case where ultrasonic detection is being utilized, data from each element of a linear array of ultrasonic elements can be acquired. These elements make up an array that is analogous to a row of pixels on a computer monitor (where each row is offset from the next by defining the starting X,Y position of the first pixel and when all the rows are displayed in proper order, a full image can be displayed).

Each time the array is moved a predefined distance (how far depends on the resolution requested by the operator), the NDI scanner hardware 22 receives a new scan strip of data from the NDI sensor unit 8 (representing a "row" of pixel data) via cable 11. The scan strip data is saved to memory. The NDI software uses the current X_pos and Y_pos data derived from the pulse data that was sent to locate the starting point in the image where to place the row of pixels.

The NDI scanner hardware 22 associates the position data and the scan imaging data. The associated data is then sent to an NDI analysis and display computer 24, which uses the position data and scan imaging data to assemble a two-dimensional image of the object being scanned for display on display monitor 26. In accordance with one implementation, the NDI scanner hardware 22 and the NDI analysis and display computer 24 may be connected components of a phased array acquisition instrument such as the TomoScan FOCUS LT, which is commercially available from Olympus Corporation.

The position data derived from the simulated encoder pulses enables the NDI analysis and display computer 24 to compute and display a final C-scan. The C-scan presentation provides a plan-type view of the location and size of part features. In the case of ultrasound imaging, the plane of the image is parallel to the scan pattern of the ultrasonic transducer array of the NDI sensor unit. In a C-scan, there is location information shown in the display. The location is found along the horizontal and vertical axes (or rulers) of the NDI data display. Individual pixels make up the C-scan. The width of each pixel directly corresponds to a specific number of pulses, which is defined by the resolution of a simulated dimensional encoder associated with a first axis of the part, while the height of each pixel directly corresponds to a specific number of pulses, which is defined by the resolution of a simulated dimensional encoder associated with a second axis of the part which is perpendicular to the first axis. Operators are able to make area measurements of flaws that might show up in the C-scan.

FIG. 1 shows one possible configuration for the system, but other configurations are also possible, such as having the motion capture and application software running on a single computer, or combining the NDI scanning system components into a single device.

Figure 2A:
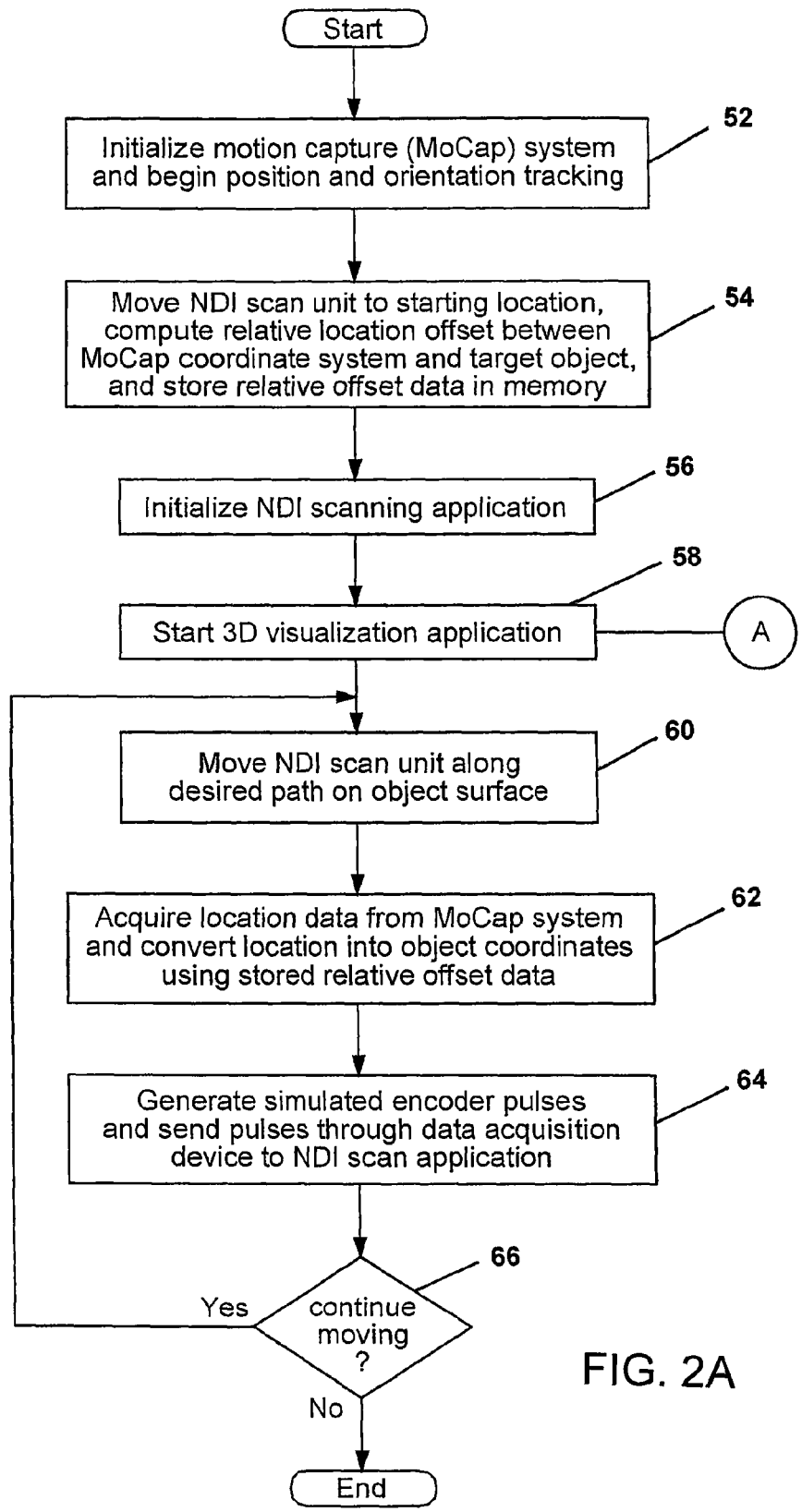
FIGS. 2A and 2B are respective portions of a flowchart showing a process for motion capture tracking and visualization of an NDI sensor unit in accordance with one embodiment.
Figure 2B:
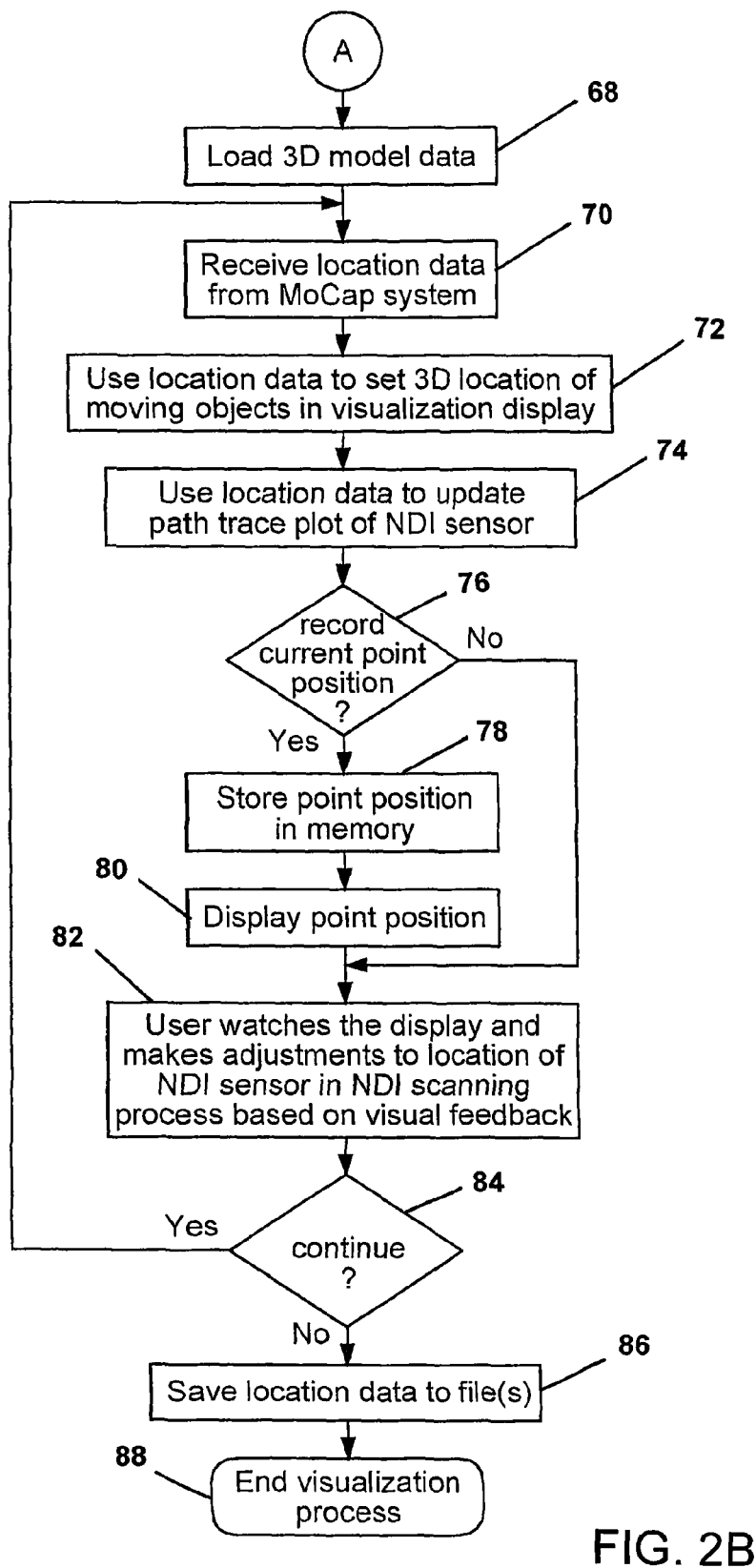

FIGS. 2A and 2B form a flowchart showing a process for motion capture tracking and visualization of an NDI sensor unit in accordance with one embodiment. Referring to FIG. 2A, the tracking process comprises the following steps:

Steps 52: As part of the initialization process, the motion capture system is set up. Then the motion capture system starts the process of tracking the position and orientation of any markers in the capture volume with respect to the motion capture coordinate system.

Steps 54: Relative position and orientation offsets between the motion capture coordinate system and the coordinate system of the object (e.g. airplane) to be scanned are determined. This process begins by finding the same physical location in both coordinate systems. From this common location the relative pose between the two coordinate systems can be determined using 4×4 homogeneous transformation matrices and matrix algebra. This relative pose, which describes the relative transformation between the scanned object and the motion capture coordinate systems, will be used to convert any new motion capture measurements of the location (position and orientation) of the tracked objects (e.g., an NDI sensor unit) in the environment into the coordinate system of the scanned object. This same process can also be used to calibrate the motion capture coordinate system to an arbitrary coordinate system anywhere in the environment.

In accordance with the embodiment depicted in FIG. 2A, while the motion capture system is operating, an NDI sensor unit is moved to a starting location adjacent the object to be scanned. The starting position and orientation of the NDI sensor unit in the scanned object coordinate system are known. While stationary at this starting location, the sensor unit's markers are detected by the motion capture cameras. The acquired position and orientation information is used to first compute the starting location of the unit in the motion capture coordinate system and then compute the relative position and orientation offsets between the motion capture and scanned object coordinate systems. That relative offset data is stored in memory for later use in converting any new motion capture measurements of the location (position and orientation) of the tracked objects within the capture volume to the coordinate system of the scanned object.

Step 56: After the relative offsets have been determined, the NDI scanning application is initialized.

Step 58: Also, a three-dimensional visualization application (to be described later with reference to FIG. 2B) is started. In some embodiments the visualization application runs on the motion tracking and applications computer (item 16 in FIG. 1).

Step 60: After initialization of the NDI scanning application, the NDI sensor unit (initially at the starting location) is moved along a desired path on the surface of the object to be scanned.

Steps 62: As the NDI sensor unit moves, location data (i.e., position and orientation data derived from image data created by the light reflected from the markers attached to the NDI sensor unit) is acquired by the motion capture processor. This location data is measured with respect to the frame of reference of the motion capture coordinate system. The applications computer converts that location data into location data referenced to the coordinates of the scanned object coordinate system. More specifically, the stored relative offset data is used to convert new motion capture measurements of the location (position and orientation) of the NDI sensor unit objects within the capture volume to the coordinate system of the scanned object.

Steps 64: The applications computer uses the resulting location data to generate simulated encoder pulses. The simulated encoder pulses are sent to the NDI scanning application via a data acquisition device. The NDI scanning application converts the simulated encoder pulses into position data (e.g., X,Y position data). The position data is associated with the scan imaging data to display an image of the scan plane as previously described.

Step 66: A determination is then made whether the NDI sensor unit should continue to move, i.e., whether it has reached its preset stopping point. If not, then Steps 60, 62 and 64 are repeated as shown in FIG. 2. If the stopping point has been reached, then motion of the sensor unit ceases and the data acquisition process is terminated.

In accordance with one embodiment, the coordinate transformation process (see Step 54 above) initializes the starting location of the NDI sensor array to describe the relationship between the motion capture coordinate system and the coordinate system of the scanned object. This is accomplished using standard 4×4 homogeneous transformation matrices and matrix algebra. This coordinate conversion is described by the following matrix equation:

$$_S^O T = (_O^M T)^{-1} {_S^M T}$$

where the output, $_S^O T$, is the transform describing the location of the sensor relative to the scanned object coordinate system; $(_O^M T)^{-1}$ is the inverse of the transform of the scanned object coordinate system into the motion capture coordinate system (defined during initialization for flat surfaces); and $_S^M T$ is the transform describing the location of the sensor relative to the motion capture coordinate system, which is what is being measured at each update. The foregoing equation is computed at runtime, and the result is used as the input to the encoder pulse generation step, i.e., the simulated encoder pulses simulate the encoder pulses that would have occurred had the position of the sensor relative to the scanned object been encoded using position encoders attached to the sensor.

In some cases, including those involving scanning of curved surfaces, transforming motion data to a fixed Cartesian coordinate system for the target object is not sufficient. In those cases it may be desirable to take into account the local curvature of the scanned object. This can be accomplished using a coordinate system defined with respect to the NDI scan unit and its attached marker pattern. In this coordinate system, one axis is defined to be parallel to the scan array, and another axis is defined in the direction perpendicular to the NDI scanner interface surface (which is held parallel to the target surface during scanning). As the NDI scanner is moved, this perpendicular vector stays aligned with the surface normal of the scanned object, and incremental changes in location of the NDI scanner are represented as $\Delta X$ and $\Delta Y$ defined in this local coordinate system. The $\Delta X$ and $\Delta Y$ values are then converted directly into simulated encoder pulses for transmission to the NDI scanning system.

Note that this simulated encoder pulse method allows the X-Y motion data to be input into any NDI scanning application that accepts encoder inputs, without modification to the NDI scan application. The position update process happens continuously as the user or automated system moves the NDI sensor unit over the scanned object.

In accordance with one embodiment, the position data flow in the system depicted in FIG. 1 may be as follows:

(1) The motion capture processor 14 receives image data from cameras 2 and outputs position data and orientation data representing the position and orientation of the pattern of markers 10 attached to inspection unit 8 relative to the motion capture reference coordinate system.

(2a) If the marker pattern was defined so that its origin aligns with the origin of the NDI sensor unit 8, then the position data and orientation data from the motion capture system also represent the position and orientation of the NDI sensor unit (since the data is identical in this case), but if the origins are not aligned, then the motion tracking and applications PC 16 is instructed to transform the tracked position data and orientation data associated with the marker pattern reference frame into the inspection unit reference frame (using matrix multiplications).

(2b) If the origin of the motion capture system is aligned with the origin of the part being scanned, then the position data and orientation data from the motion capture system are in the same coordinate system as the part being scanned, but if the origins of the motion capture system and the coordinate system of the part being scanned are not aligned, then the motion tracking and applications PC 16 is instructed to transform the tracked position data and orientation data defined in the motion capture coordinate system into the coordinate system of the part being scanned (using matrix multiplications).

(3) The motion tracking and applications PC 16 then converts only the X and Y position data (which is defined in the coordinate system of the part being scanned) into a quadrature pulse form (which is a series of high (1) or low (0) values).

(4) The data acquisition device 20 converts the quadrature pulse instructions from the motion tracking and applications PC 16 into electrical signals that simulate encoder pulses.

(5) The simulated encoder pulses are sent over wires to the NDI scanner hardware 22.

(6) The simulated encoder pulses are received by the NDI scanner hardware 22, which decodes the simulated encoder pulses into position data representing the position of the NDI sensor unit 8 relative to the coordinate system of the part being scanned.

Steps (2a) and (2b) involve similar types of processes for aligning the marker pattern with the tracked object and aligning the motion capture system with the scanned part, respectively. These steps would not be necessary if the respective origins were already aligned.

Optionally, three-dimensional visualization can be integrated with motion capture tracking and NDI scanning. This visualization runs on a computer with three-dimensional graphics capabilities. In one embodiment the visualization application runs on the motion tracking and applications computer (item 16 in FIG. 1) as an independent computational process in parallel with the NDI process. The visualization application can also be run in a post-process (analysis only) mode, i.e., without the NDI application.

As with the NDI scan application that receives real-time location data from the motion capture system (in the form of encoder pulses), a separate three-dimensional visualization process running in parallel with the NDI scanning process also uses real-time location data from the motion capture system to position three-dimensional object models in a virtual environment (but it is not necessary to convert location data into encoder pulses for visualization). This three-dimensional virtual environment display provides situational awareness of the NDI sensor relative to the scan environment.

Referring to FIG. 2B, the visualization process in accordance with one embodiment comprises the following steps.

Step 68: Three-dimensional model data (including, e.g., data which models an NDI scan unit) is loaded into computer memory.

Step 70: Location data is received from the motion capture system.

Step 72: In the three-dimensional visualization process, the location data (position and orientation) from the motion capture system is associated with one or more tracked objects (e.g., an NDI scan unit) and is used to position three-dimensional models of the tracked objects in the virtual environment. The virtual environment also includes other scene elements, such as static objects (including the object being scanned) and status display indicators. The operator can use this real-time display information during the scanning process to make adjustments to the scan, for example, to pick up missed areas.

Step 74: A continuous path trace of the NDI sensor can also be plotted in the virtual environment to show where the NDI sensor has been. This path serves as a spatial-temporal indicator and record of the scanning session. It can be saved to a file and reloaded at a later time to compare with other paths.

Step 76: The operator may also choose to mark the current position of the NDI sensor in the three-dimensional environment with a point, line, or other geometric entity. This marking element stays associated with the three-dimensional location and can be used to indicate the status of the marked area, for example, to indicate that the location has been scanned. If the user chooses not to record the current point position of the NDI sensor unit, the user still has the option to adjust the location of the NDI sensor unit, as described below in Step 82.

Step 78: The points of interest selected by the user are saved as a record of the NDI scan.

Step 80: Each stored point position is displayed for viewing by the user. An animation showing the locations of the NDI scan can also be saved and replayed to show the entire motion sequence of the NDI sensor for the scan.

Step 82: During scanning, the user watches the display and makes adjustments to the location of the NDI sensor unit based on visual feedback.

Step 84: The user or the system determines whether the scanning process should continue. If Yes, then the computer continues to receive location data from the motion capture system (Step 70).

Step 86: If the user or the system determines that the scanning process should not continue, the location data is saved in files.

Step 88: After the location data for the NDI sensor unit has been saved, the visualization process is ended.

This system described above can support full 6-DOF freeform motion, but current NDI scan applications cannot; they only allow input X-Y motions of the surface (without allowing changing rotation). This presents a problem for the freeform motion use case because it is up to the user to make sure that orientation does not change during motion. Since the visualization process described above tracks 6-DOF motion, it may be used to help guide the user to maintain orientation. The system can be used to provide additional feedback to the user to warn that orientation is out of range. Some options include visual, audio, or tactile (haptic) feedback. For example, an orientation display indicator may be shown on the computer display or head-mounted display, or lights may be used directly on the sensor.

During post-scan analysis, the location markers, path traces, and animations can be used along with the NDI scan data itself, to confirm that all scan areas have been addressed. NDI scan data collected by the NDI scanning system can be associated with the three-dimensional location markers in the virtual environment. This enables the operator to select any marker to bring up the NDI scan image for that location.

Figure 3:
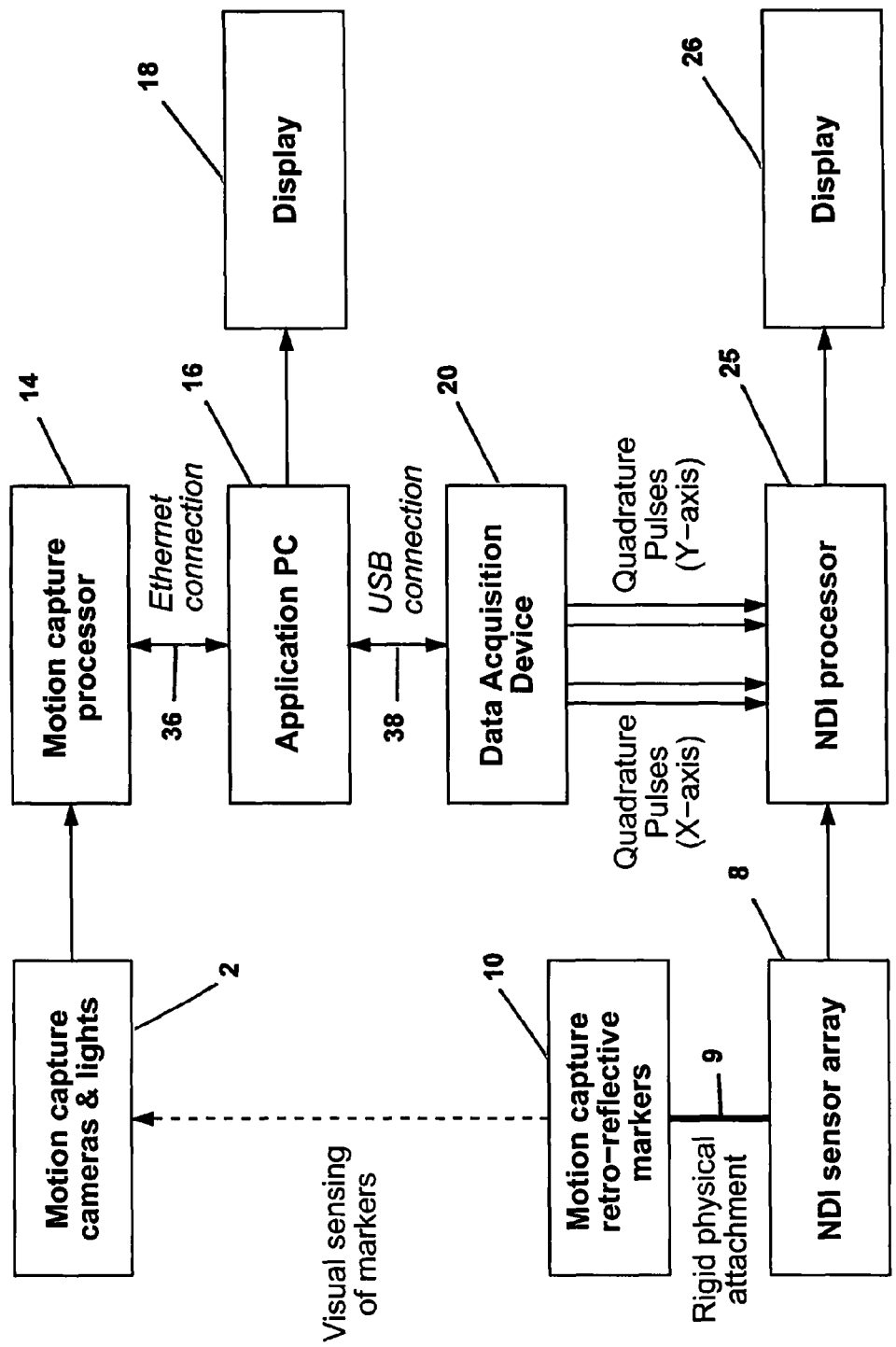
FIG. 3 is a block diagram showing components of a motion capture system in accordance with an alternative embodiment. The solid arrows indicate electrical signals; the dashed arrow indicates the visual sensing of markers; and the bold solid line between the markers and sensor array blocks indicates a rigid physical attachment.

FIG. 3 shows a block diagram that represents a system configuration in which the data processing performed by NDI scanner hardware and NDI analysis and display computer (items 22 and 24 shown in FIG. 1) is combined in one NDI processor 25. In FIG. 3, the system comprises a plurality of motion capture cameras 2 which detect light (represented by the dashed arrow) reflected from a group of retro-reflective markers 10 attached to an NDI sensor array 8 (also referred to here as an "NDI sensor unit"). The resulting imaging data from the cameras is collected and processed in real-time by the motion capture processor 14 to generate data representing the position and orientation (i.e., location data) of the NDI sensor array 8. The location data is sent to the applications computer 16 via an Ethernet connection 36. The applications computer 16 then transforms that location data so that the frame of reference is the scanned object coordinate system instead of the motion capture coordinate system. Then the applications computer 16 converts that location data into simulated quadrature encoder pulses and sends the pulse commands, via USB connection 38, to a data acquisition device 20 that generates the simulated quadrature pulse signals. (The data acquisition device may be a USB4 encoder data acquisition USB device commercially available from US Digital, Vancouver, Wash.) The data acquisition device 20, in turn, sends the simulated encoder pulses for two motion axes (e.g., X and Y) to the NDI processor 25. In the meantime, as the NDI sensor array 8 is scanned across the surface to be inspected, the NDI sensor array produces a one-dimensional strip of data (similar to a column of pixels), which is sent to the NDI processor 25 while the latter is receiving simulated encoder pulses. The NDI processor 25 associates the scan strip data (i.e., also referred to herein as "scan imaging data") with X,Y position data derived from the simulated encoder pulses. The associated data is used to assemble a two-dimensional image of the scanned area for display on a display monitor 26.

In the case where the sensors are ultrasonic transducers, the NDI processor 25 in FIG. 3 provides activation pulses to the ultrasonic transducers of array 8, in which case the arrow between blocks 8 and 25 in FIG. 3 would be double-headed to indicate the flow of pulses in one direction and acquired data in the other direction. The processor sends electrical pulses to the transducers, which convert them into ultrasonic pulses. The returning ultrasonic pulses are converted at the array back into electrical pulses that are sent back to the processor for measurement.

In accordance with one implementation, the NDI processor 25 and the display monitor 26 may be integrated components inside a single enclosure, such as in the OmniScan MX2 phased array flaw detector, which is commercially available from Olympus Corporation.

An alternative embodiment in which the software functions executed by the NDI scanner hardware and the NDI analysis and display computer can be executed by a single computer, i.e., two hardware components can be integrated inside a single enclosure.

Multiple NDI scanning units can be tracked simultaneously using the same motion capture system, which would allow multiple operators to work in the same capture volume. In addition, in the case where the NDI scan unit is mounted to the distal end of an NDI arm device (e.g., a robotic or cavity inspection arm, possibly with one or more joints), selected components of the arm device can be simultaneously tracked in space by placing motion capture markers at the joints or other places on the arm.

Figure 4:
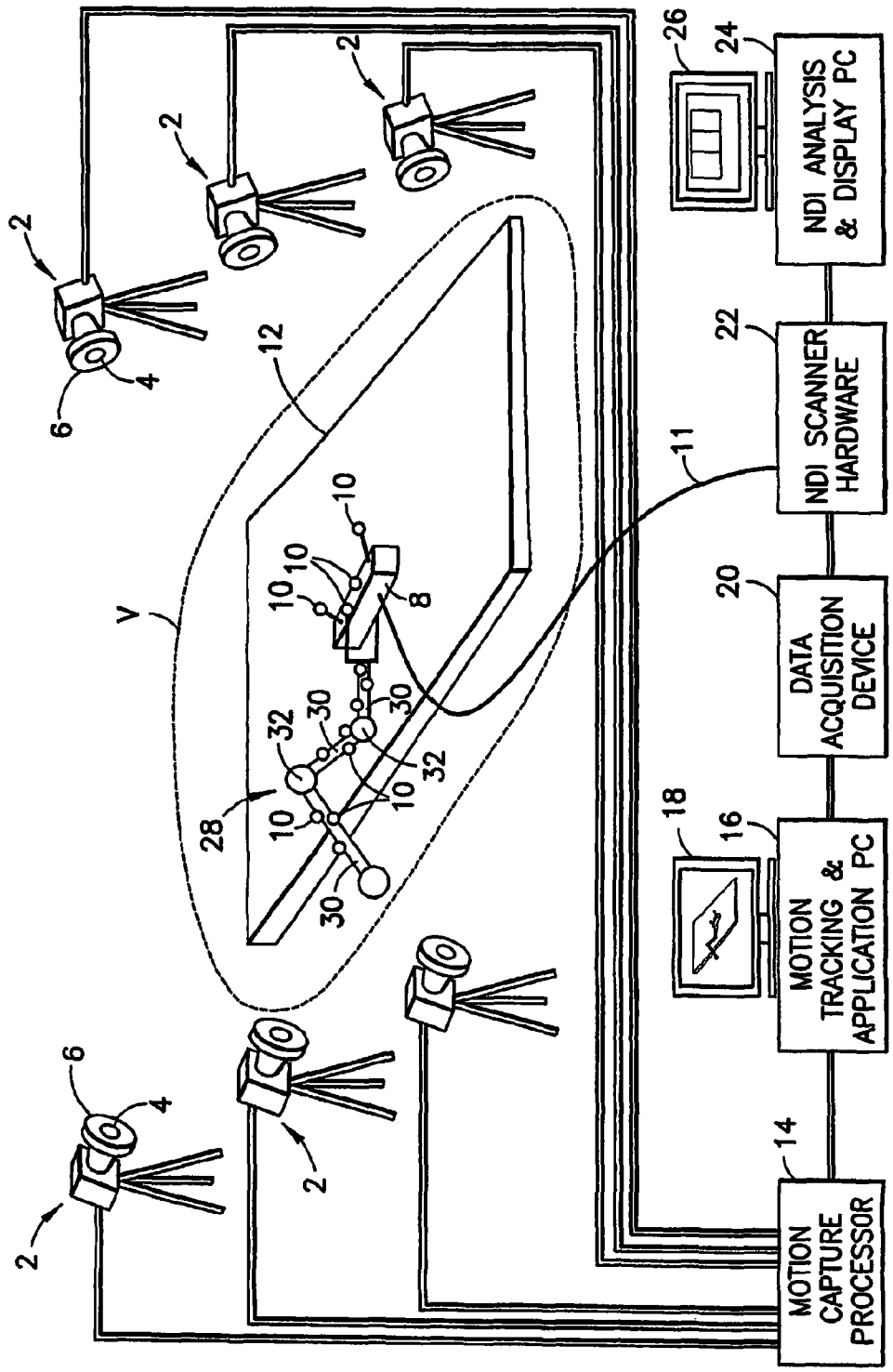
FIG. 4 is a diagram showing a schematic view of a motion capture system in accordance with one embodiment which is suitable for tracking both an arm-mounted NDI sensor unit and its associated arm mechanism.

One example of an NDI arm device provided with retro-reflective markers is shown in FIG. 4. The system shown in FIG. 4 differs from the system shown in FIG. 1 only in that the NDI scan unit 8 is attached to a distal end of an NDI arm device 28. This NDI arm device comprises a plurality of arm segments 30 coupled end to end by respective joints 32. In the example shown in FIG. 4, each arm segment 30 of the arm mechanism 28 has three retro-reflective markers 10 (more than three could be used). Each set of three markers has a unique pattern to facilitate identification by the motion capture system. Alternatively, respective groups of markers could be attached to respective joints 32.

Figure 5:
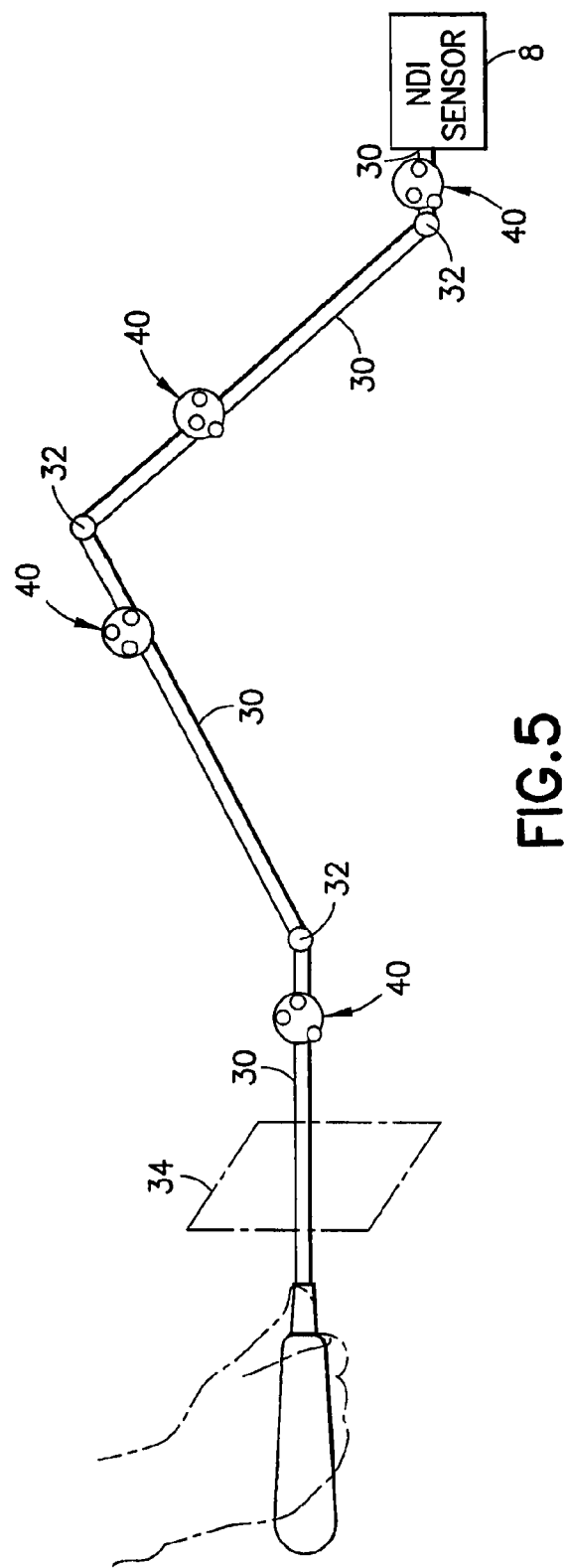
FIGS. 5 and 6 are diagrams showing schematic views of respective example arm mechanisms with markers suitable for use with motion capture tracking.
Figure 6:
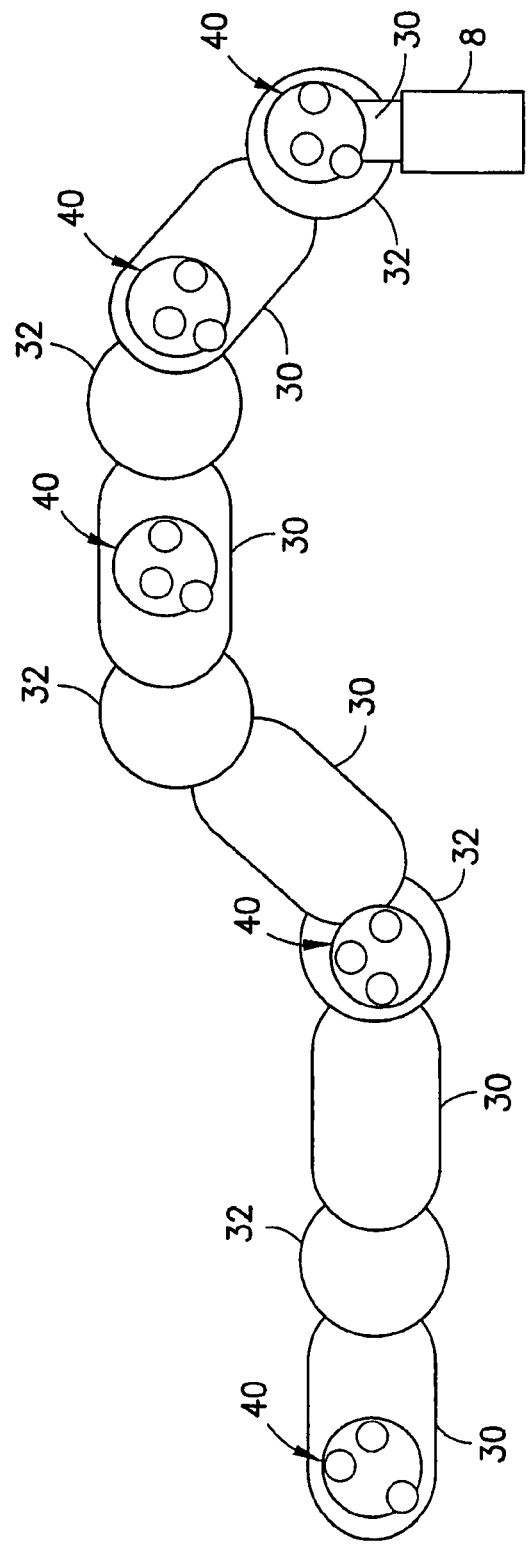

Location information about the segments of the arm device, or other components of the system, is useful for collision avoidance and navigating around obstacles in confined spaces. For example, FIG. 5 shows an extended-reach NDI arm device which can be inserted through an access hole 34 and into a cavity (cavity boundaries not shown) requiring inspection. An NDI sensor unit 8 is rigidly mounted on the distal end of a distal segment 30. Each segment 30 has a group 40 of three retro-reflective markers attached thereto. In an alternative embodiment of an NDI arm device, groups 40 of retro-reflective markers are attached to some segments 30 and to some joints 32, as seen in FIG. 6. These arrangements allow the motion capture system to track the NDI scanning unit 8 and the links and/or joints of an arm mechanism. Each joint 32 may comprise a ball joint or a revolute joint. (A revolute joint (also called pin joint or hinge joint) is a one-degree-of-freedom kinematic pair used in mechanisms. Revolute joints provide single-axis rotation.)

A motion capture system provided by any one of several vendors can be used in the processes described above. Suitable motion capture systems are the T-Series from Vicon, Inc.; OptiTrack from NaturalPoint, Inc.; and Raptor from Motion Analysis, Inc.

The systems disclosed herein use an external tracking system that does not rely on encoders in contact with the scanned surface. The concept can be applied to a variety of free-form motion, such as hand-held as well as automated types of motion input. The system can be used to track other objects in the environment, in addition to one or more NDI scan sensor arrays. The system only uses passive markers attached to the NDI scan sensor array (or other objects), which means there are no wires or other electronics for tracking on the moving components.

In accordance with the above-described motion capture-based concept, the passive retro-reflective markers attached to the NDI scan sensor array housing (or on any part rigidly attached to the NDI sensor) are visible to the cameras. But if too many of the markers are occluded, the system cannot track the motion of the sensor unit. Also, there needs to be sufficient space to locate the motion capture cameras in the work area.

Motion capture systems are commercially available products that provide a software API that allows developers to create their own custom software application to access the motion data through a standard network socket connection. The data acquisition device also has an API that allows access to the hardware.

The ability to track multiple scan units or other NDI components concurrently could reduce the cost of and time for scanned inspections of large structures in both manufacturing and in-service environments.

The NDI sensor can be any sensor that collects inspection data from a location or area of a structure. It can be touching or nearly touching the structure (ultrasonic, eddy current, magnetic, microwave, x-ray backscatter, etc.), or standing off from the structure at some distance (infrared thermography, terahertz, etc.). It can be a single transducer or an array (linear or multiple dimension). Proper orientation of the probe is facilitates inspection. The motion capture system measures both position and orientation, but the NDI system does not have a way to accept orientation data; it accepts only X and Y position data. The fact that the NDI system does not have an input for orientation means that the users will need to make sure that the orientation of the inspection unit does not change after they start their scans. The users can choose any starting orientation they want, holding the selected angle constant for the full scan. The motion capture system can may constantly measure orientation of the inspection unit and provide feedback to the operator of what the orientation is (perhaps with a visual indicator, or a warning if the orientation varies too far from the starting value).

In accordance with one alternative embodiment, the sensor system may comprise a pair of units disposed on opposing sides of a structure to be inspected, one unit transmitting radiation and the other receiving radiation that has been transmitted and passed through the structure being inspected, thereby providing a through-transmission type inspection (e.g., through-transmission ultrasound). Although systems are known for coupling the respective units of through-transmission system so that they move together, in cases where such units are positioned using independent positioning systems, the motion capture system can be used to determine the location of both units. The independent positioning systems can then be controlled to compensate for any deviation in position or orientation of either unit to ensure alignment of the units with each other.

While the embodiments disclosed above are specific to NDI activities, the same principle can be applied to other remotely controlled operations, such as scarfing, cleaning, painting, etc., in which the system for positioning a tool-carrying mobile platform or crawler vehicle is designed to receive encoder pulses.

In alternate embodiments, more than two encoders can be simulated for systems that have additional inputs. For example, if a system has X, Y, and Z inputs, the measurement data from the motion capture system could be used to simulate motion of the three X, Y, and Z encoders. Angle measurement from a rotational encoder can also be simulated using motion from the consecutive links on either side of a rotational joint. This can be accomplished using the well-known angle-axis formulation to determine the angle between the links given the respective transformation matrices.

In addition, the system described herein can also be applied in situations where an "activator" is moved across the surface of a structure and exerts an effect or applies a treatment on selected portions of the structure. The motion capture system would track the activator and feed its location back to an imager or stand-off sensor that detects the response of the structure to the activation. For example, a crawling heating element could be moved around on or adjacent to a surface of the structure, and an infrared camera on a pan-tilt controller could be arranged to follow behind the heating element (using the tracking information) from a stand-off position and record the response at or near the heating element.

Alternatively, the imager or sensor could be disposed on the opposite side of the structure being affected or treated by the activator.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

As used in the claims, the term "computer system" should be construed broadly to encompass a system having at least one computer or processor, and which may have two or more computers or processors that communicate through a network or bus.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude any portions of two or more steps being performed concurrently or alternatingly.

The invention claimed is:

1. A method for scanning across a surface of a part within a capture volume, comprising:

(a) scanning the surface of the part using an inspection unit;
(b) acquiring measurement data representing one or more motion characteristics of the inspection unit using a motion capture system operatively disposed with respect to the capture volume, the one or more motion characteristics being measured using a plurality of retro-reflective markers attached to the inspection unit in a known pattern;
(c) deriving position data and orientation data from the measurement data, said position data and orientation data representing positions and orientations of the inspection unit in a coordinate system of the part being scanned;
(d) acquiring inspection data during step (a); and
(e) combining the position data derived in step (c) with the inspection data acquired in step (d).

2. The method as recited in claim 1, further comprising displaying the inspection data in accordance with the position data.

3. The method as recited in claim 1, further comprising using the position data and the orientation data to position and orient a three-dimensional model of the inspection unit in a virtual environment.

4. The method as recited in claim 3, further comprising displaying a continuous path trace of the inspection unit in the virtual environment to show where the inspection unit has been.

5. The method as recited in claim 1, further comprising determining relative position and orientation offsets between the coordinate system of the motion capture system and the coordinate system of the part.

6. The method as recited in claim 1, wherein step (b) comprises utilizing data captured from image sensors inside multiple cameras to triangulate a three-dimensional position and orientation of the inspection unit with retro-reflective markers between the multiple cameras configured to provide overlapping projections.

7. A method for scanning across a surface of a part within a capture volume, comprising:
(a) moving an inspection unit along a desired path on the surface of the part;
(b) measuring positions of retro-reflective markers attached to the inspection unit with respect to a motion capture coordinate system;
(c) converting measurements of the positions of the retro-reflective markers with respect to the motion capture coordinate system into first position data and orientation data representing the positions and orientations of the inspection unit with respect to the coordinate system of the part;
(d) encoding the first position data into simulated encoder pulses which indicate the positions of the inspection unit with respect to the coordinate system of the part;
(e) acquiring inspection data during movement of the inspection unit along the desired path;
(f) sending the simulated encoder pulses and the acquired inspection data to a processor;
(g) decoding the simulated encoder pulses into second position data representing positions of the inspection unit with respect to the coordinate system of the part;
(h) associating the second position data with the inspection data; and
(i) displaying the inspection data in accordance with associations made in step (g).

8. The method as recited in claim 7, further comprising using the position data and orientation data representing the positions and orientations of the inspection unit with respect to the coordinate system of the part to position and orient a three-dimensional model of the inspection unit in a virtual environment.

9. The method as recited in claim 7, further comprising determining relative position and orientation offsets between the motion capture coordinate system and the coordinate system of the part.

10. The method as recited in claim 7, wherein step (b) comprises utilizing data captured from image sensors inside multiple cameras to triangulate a three-dimensional position of the inspection unit between the multiple cameras configured to provide overlapping projections.

11. A system comprising:
an inspection unit disposed on a portion of a surface of a part located within a capture volume and operable to acquire inspection data during its motion;
a motion capture subsystem programmed to acquire first location data representing positions and orientations of said inspection unit with respect to a motion capture coordinate system;
a motion tracking subsystem connected to receive said first location data from said motion capture subsystem and programmed to output second location data which is a function of the first location data received from said motion capture subsystem, said second location data representing positions and orientations of said inspection unit with respect to a coordinate system of said part;
a data acquisition device connected to receive said second location data from said motion tracking subsystem and programmed to encode portions of said second location data received from said motion tracking subsystem into simulated encoder pulses; and
an inspection scanning subsystem with pulse-based position inputs connected to receive said simulated encoder pulses from said data acquisition device and said inspection data from said inspection unit, said inspection scanning subsystem with pulsed-based position inputs being programmed to decode encoder pulses into position data and then associate said position data with said inspection data for display, wherein said position data represents the positions of said inspection unit with respect to said coordinate system of said part.

12. The system as recited in claim 11, wherein said motion capture system comprises at least two cameras with illuminators and said inspection unit carries a plurality of retro-reflective markers arranged in a known pattern.

13. The system as recited in claim 11, wherein said motion tracking subsystem comprises a computer system programmed to convert said first location data into said second location data using stored relative offset data of said motion capture coordinate system and said coordinate system of said part.

14. A system for nondestructive inspection of a part within a capture volume, comprising:
an inspection unit disposed on a surface of said part within said capture volume and operable to acquire inspection data during its motion;
a plurality of retro-reflective markers attached to said inspection unit and arranged in a known pattern;
a plurality of illuminators;
a plurality of cameras capable of receiving light transmitted by said illuminators and reflected from said markers and converting said received light into image space measurement data representing one or more motion characteristics of said inspection unit with respect to a motion capture coordinate system; and a computer system connected to receive inspection data from said inspection unit and image space measurement data from said cameras, said computer system being programmed to perform the following operations:
(a) deriving position data and orientation data from the image space measurement data, said position data and orientation data representing the positions and orientations of said inspection unit with respect to a coordinate system of said part and; and
(b) associating the position data with the inspection data.

15. The system as recited in claim 14, further comprising a display monitor connected to said computer system, said computer system being further programmed to control said display monitor to display the inspection data in accordance with associations made in operation (b).

16. The system as recited in claim 14, further comprising a display monitor connected to said computer system, said computer system being further programmed to control said display monitor to display in a virtual environment a three-dimensional model of said inspection unit positioned and oriented relative to a three-dimensional model of said part.

17. The system as recited in claim 16, wherein said computer system is further programmed to control said display monitor to display a continuous path trace of said inspection unit to show where said inspection unit has been.

18. The system as recited in claim 14, wherein said computer system is further programmed to determine relative position and orientation offsets between the motion capture coordinate system and the coordinate system of said part.

19. A system for nondestructive inspection of a part within a capture volume, comprising:
an inspection unit disposed on a surface of said part within said capture volume and operable to acquire inspection data during its motion;
a plurality of retro-reflective markers attached to said inspection unit and arranged in a pattern;
a plurality of illuminators;
a plurality of cameras capable of receiving light transmitted by said illuminators and reflected from said markers and converting said received light into image space measurement data;
means for converting the image space measurement data from at least two cameras into first position data and orientation data representing the positions and orientations of said inspection unit with respect to a motion capture coordinate system;
means for transforming said first position data into second position data representing the positions of said inspection unit with respect to a coordinate system of the part being scanned;
means for encoding said second position data into simulated encoder pulses;
means for decoding said simulated encoder pulses into third position data representing the positions of said inspection unit with respect to the coordinate system of the part being scanned; and
means for displaying an image based on inspection data acquired by said inspection unit and said third position data.

20. The system as recited in claim 19, wherein said means for encoding comprise:
a computer that converts said second position data into digital pulse commands; and
a data acquisition device that converts said digital pulse commands into said simulated encoder pulses.

* * * * *